United States Patent [19]

Donley

[11] 3,905,622
[45] Sept. 16, 1975

[54] ADAPTOR UNIT FOR USE WITH FLUID NOZZLES
[75] Inventor: Michael J. Donley, Van Nuys, Calif.
[73] Assignee: Alan Scott, Los Angeles, Calif.
[22] Filed: Jan. 28, 1974
[21] Appl. No.: 436,969

[52] U.S. Cl. .............................. 285/338; 285/346
[51] Int. Cl.² ..................... F16L 17/00; F16L 19/00
[58] Field of Search ............ 285/54, 338, 110, 196, 285/346, 95, 96, 162, 170, 348, 356, 357; 138/90; 220/24.5

[56] References Cited
UNITED STATES PATENTS
3,233,920  2/1966  Ammann ............................. 285/54
3,322,890  5/1967  Kennedy et al. .................. 285/54 X Primary Examiner—Geo. V. Larkin
Attorney, Agent, or Firm—Herzig & Walsh

[57] ABSTRACT

An adaptor unit adapted for sealing connection with a fluid nozzle, particularly, an air nozzle to provide connection between it and a tubular extension fitting having an air nozzle at the end particularly adapted for reaching into the valve stem of both the inner and outer of a pair of dual tires.

7 Claims, 4 Drawing Figures

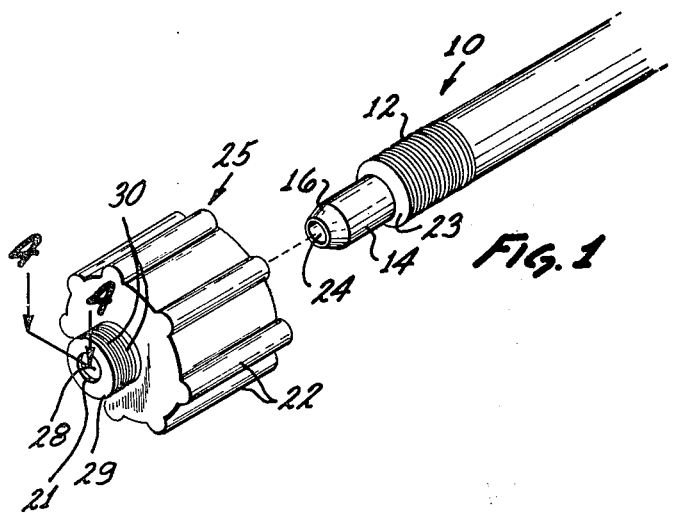
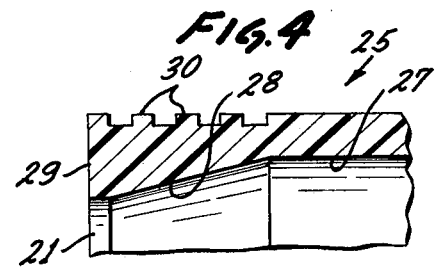
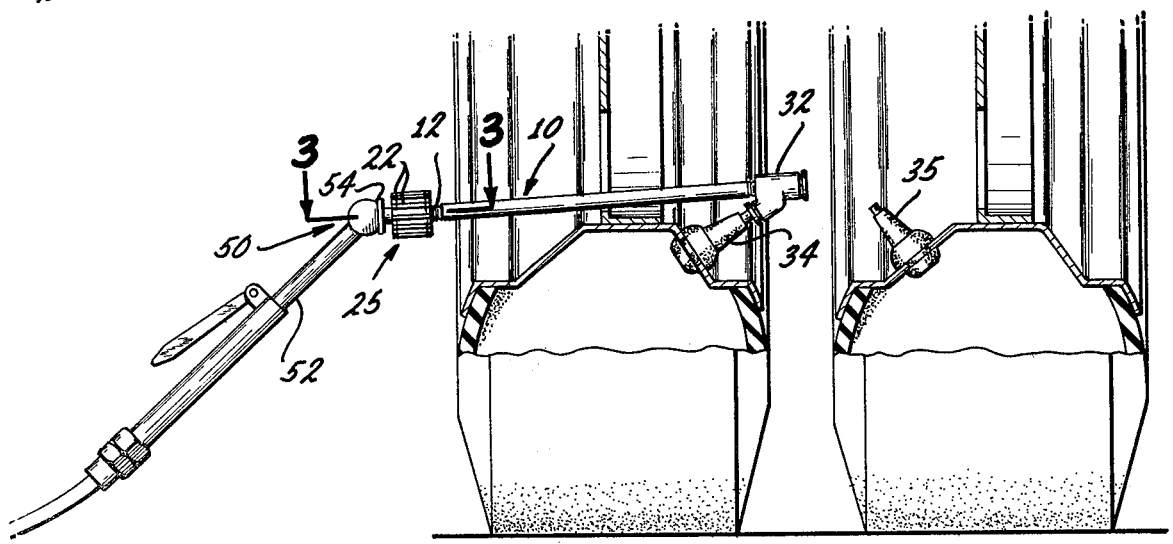
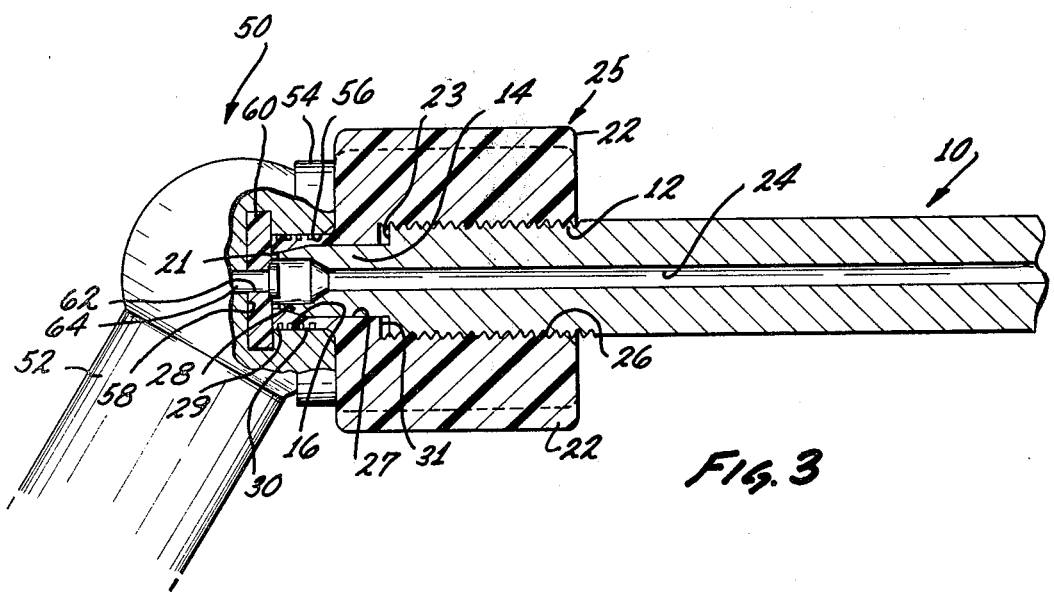

_3,905,622_

ADAPTOR UNIT FOR USE WITH FLUID NOZZLES

This application is an improvement over application Ser. No. 275,795 filed July 27, 1972, owned by a common assignee, now U.S. Pat. No. 3,786,994.

SUMMARY OF THE INVENTION

The invention as described in detail herein is an adaptor unit adapted for sealing connection and securement to the nozzle on the end of an air line. The adaptor means connects the air nozzle to a tubular extension or fitting which itself has an air nozzle on the end adapted to be fitted onto the end of a valve stem on the inner and outer of a pair of dual side-by-side tires.

BACKGROUND OF THE INVENTION

Many large trucks and large vehicles in use contemporarily have dual side-by-side tires. Requisite air pressures must be maintained in the tires. In order to put air into the tires of the dual side-by-side tires, there is required a special extending fitting with a nozzle at the end which can be extended through the outside wheel to the valve stem on the inner or outer tire. Typically, this fitting may be about eight inches long with an air nozzle on the end. This fitting is rigid. Because of the position of the valve stem of the outside tire, preferably, the fitting is provided with dual chucks, to accommodate reaching both the inner and outer valve stems.

Typically, only truck stops have or are equipped with this particular extendible fitting with nozzle for reaching in to the valve stems of the inner and outer wheels. In regular stations, the air line is not equipped with this extended fitting at the end, and the trucker is unable to put air into the tires. He neglects to do so when the air pressure in the tires is low.

It is the primary object of the invention to provide means in the form of an article whereby the above problem and deficiency is overcome. The means or article is in the form of an adaptor unit which is connected to and can carry the extended fitting and which can be quickly sealingly secured and connected to the nozzle at the end of the air line as available at regular filling stations. Thus, the trucker can be equipped with his own extended nozzle fitting, and the adaptor means of the invention can quickly couple it to any standard air line nozzle. He is then able to put air into both the inside and outside tires of the dual tire assemblies. The realization of this result and purpose is an object of the invention.

In the preferred, exemplary form of the invention as described herein, it takes the form of a body carrying a movable chuck member. The body has a part with a tapered end extendible within the chuck member. The chuck member is extended into the air nozzle. The tapered end of the body is extended into the chuck member to expand it, whereby to tightly engage within the air nozzle.

In the preferred form of the invention, the chuck member has an extended part that fits into the nozzle, and it is threaded onto the body.

While the exemplary form of the invention is for use with air nozzles, it is to be understood that it might be used as well with other types of fluid nozzles and outlets.

BRIEF DESCRIPTION OF THE DRAWINGS

Further objects and additional advantages of the invention will become apparent from the following detailed description and annexed drawings, wherein:

FIG. 1 is a perspective view of a preferred form of the invention;

FIG. 2 is a schematic sectional view of a pair of dual tires illustrating use of the adaptor of the invention in applying air pressure to the inner tire;

FIG. 3 is a sectional view taken along line 3—3 of FIG. 2; and

FIG. 4 is an enlarged cross-sectional broken away view of the chuck member.

DESCRIPTION OF THE PREFERRED EMBODIMENT

Referring to the drawings, the adaptor means in the exemplary form shown comprises a body 10 which is cylindrical having a threaded cylindrical part 12 which has an extended cylindrical stem or nipple part 14, the end part of which is tapered or bevelled as shown at 16. Body 10 has a central bore 24 extending completely through it. Between nipple part 14 and the part of body 10 of larger diameter is a shoulder 23.

Numeral 25 designates a cylindrical chuck member having axial ribs 22 and having a threaded bore 26, a counterbore 27, and a converging counterbore 28 in an extending part 29. Between bore 26 and bore 27 is counterbore 31 corresponding to shoulder 23 on body 10. The chuck member is expansible, having equal axially spaced annular ribs 30 as may be seen in the figures. Stem or nipple 14 is telescoped within chuck member 25. The taper at the inside end part of chuck member 25 engages against the outside of bevelled end part 16 of body 10. At the end of taper 28 is a short bore 21 of uniform diameter.

Body 10 has at one end a dual air nozzle 32 adapted to fit over a valve such as valve stem 34 on the outer tire of the dual tires or the inner stem 35 as shown in FIG. 2. Body 10 might be coupled to the adaptor by a separate coupling.

Numeral 50 designates a typical head or nozzle on the end of an air line 52. The head or nozzle has an end flange 54. It has a counterbore 56 at the inner end of which is an enlarged bore 58 having in it a flexible sealing member 60 having a central aperture 62 through which extends valve stem 64 within head or nozzle 50.

FIGS. 2 and 3 show the adaptor means secured, joined, or coupled to head 50. To connect or couple the adaptor means to head 50, end 29 is inserted in bore 56 of head 50. The end is pressed against the flexible pad or seal member 60 as shown. Chuck member 25 is on the outside of body 10. Ribbed chuck member 25 is then rotated on the threads relative to body 10, causing body 10 to move axially into bore 28 and against the inside of it so that end part 29 of chuck member 25 is expanded by taper 16 to come into tight, secure holding and sealing engagement within bore 56 of head 50. The connection or securement having been made, the parts are as shown in the figures. Body 10 can readily be extended through the outside wheel to bring head or nozzle 32 into engagement with the end of valve stem 35 for admitting air pressure to the inner tire. Air line 52 may be a typical one with a manual valve control handle for causing air to be admitted.

From the foregoing, those skilled in the art will readily understand the nature of the construction of the invention and the manner in which it achieves and realizes the objects and advantages as set forth in the foregoing. The adaptor means may be readily coupled to the head or nozzle at the end of any air line. The trucker can of course be equipped with the extended nozzle fitting; and with the adaptor means, he possesses a capability to inflate both the inner and the outer tire of dual tires in any regular filling station.

The foregoing disclosure is representative of a preferred form of the invention and is to be interpreted in an illustrative rather than a limiting sense. The invention is to be accorded the full scope of the claims appended hereto.

What is claimed is:

1. As an article of manufacture, an adaptor means adapted to be sealingly connected to a fluid nozzle, adapted for delivering fluid to another point, said adaptor means comprising: a body including a part extendible into the fluid nozzle, said means including a fitting extending into said part and movable relative thereto whereby to produce secure coupling and sealing engagement with the nozzle whereby the fluid may be delivered to the fitting, said part being constructed to be expandible by relative movement of said fitting into it.

2. An article as in claim 1, wherein said part is an extending member configurated to fit into said fluid nozzle in sealing engagement.

3. An article as in claim 2, wherein said fitting is of sufficient length so it can be extended through the outside of one of a pair of dual tires so as to reach the valve stem on the inner of the tires.

4. An article as in claim 2, wherein said fitting has threaded engagement with said means and has an end portion configurated to expand said part.

5. An article as in claim 4, wherein said fitting has a tapered end, said part having a bore of a size whereby relative movement between said part and said fitting expands said part.

6. An article as in claim 1 wherein the fitting has a nozzle at one end adapted to engage a valve stem.

7. An article as in claim 6 wherein said last nozzle is a dual nozzle configurated whereby to be adapted to engage a valve stem on an inner tire and a valve stem on the inner side of an outer tire.

* * * * *